Figure 1:
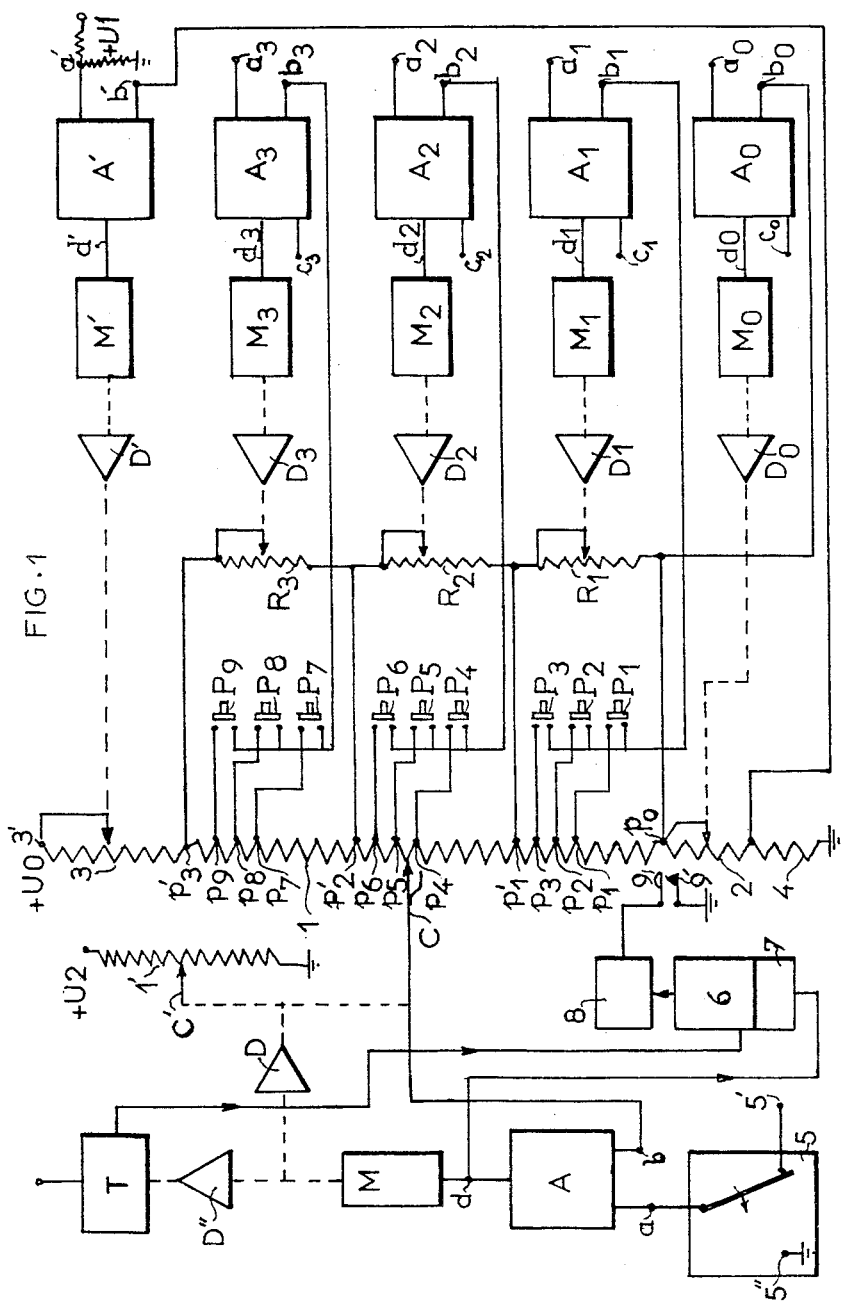

United States Patent Office 3,171,023
Patented Feb. 23, 1965

3,171,023
ANALOGUE COMPUTER MORE PARTICULARLY UTILIZABLE FOR CALIBRATING A MEASURING DEVICE
Luc Donald de Seguin des Hons, 6 Rue Rene Brement, Drancy, France
Filed Jan. 11, 1961, Ser. No. 82,110
Claims priority, application France, Jan. 22, 1960, 816,425
15 Claims. (Cl. 235—197)

The present invention relates to an analogue computer; more particularly an analogue computer for use in automatically gauging or calibrating a measuring device.

The gauging of a measuring device includes solving an equation $Y=F(X)$ based on data $X$ from the measuring device for obtaining corresponding values of $Y$, the quantity to be determined.

In automatically operated machines comprising a measuring device, the gauging or calibrating of the measuring device must be automatically controlled. It is possible to automatically gauge or calibrate the measuring device by using an analogue computer which enables one to obtain values of a variable quantity which is related to a known function. In fact, if there is introduced to the input of such a computer a value $x$ proportional to the data $X$ obtained from the measuring device, it is possible to obtain at the output of the computer a value $y$ which is a function $f(x)$. If the computer includes means permitting adjustment of its response curve, preferably automatically, it is possible to make two points of said curve of response of the computer represented by the equation $y=f(x)$ coincide with the gauging curve for the measuring device represented by equation $Y=F(X)$. The value $y$ obtained at the output of the computer provides an approximate value of the quantity $y$ to be determined, the approximation of the value being improved when the number of points of coincidence of the graphical curves representing the equations $Y=F(X)$ and $y=f(x)$ is greater.

According to the present invention, there is provided an analogue computer for determining the approximate values of a function which is related to an independent variable quantity, comprising, in combination; an electrical source of direct constant voltage, a potentiometer having a movable cursor and provided with a plurality of principal contacts which divide the resistance of the potentiometer into a plurality of sections through which said current flows, a plurality of adjustable resistances connected in parallel across the sections of the potentiometer, an electrical source of unknown voltage which is a translation of the variable quantity, and means for moving said cursor along said potentiometer so that the displacement of said cursor from one of said principal contacts selected as a reference, for which the voltage transmitted through the cursor is proportional to the magnitude of the independent variable quantity, is proportional to the approximate corresponding value of the function.

Figure 4:
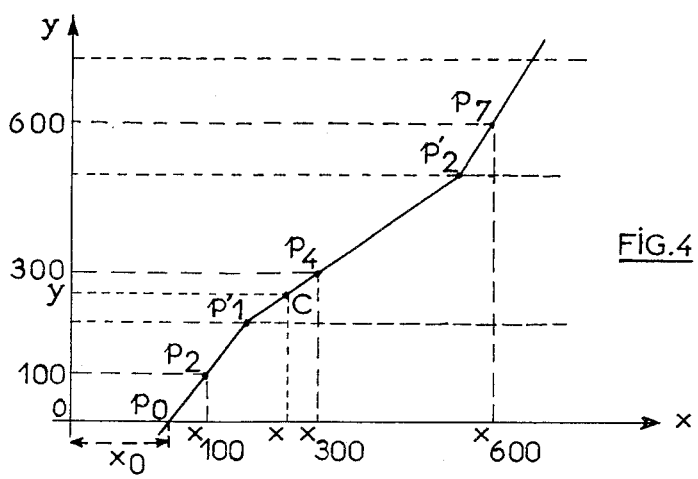
Figure 3:
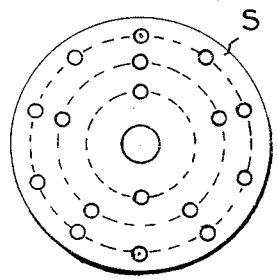
Figure 2:
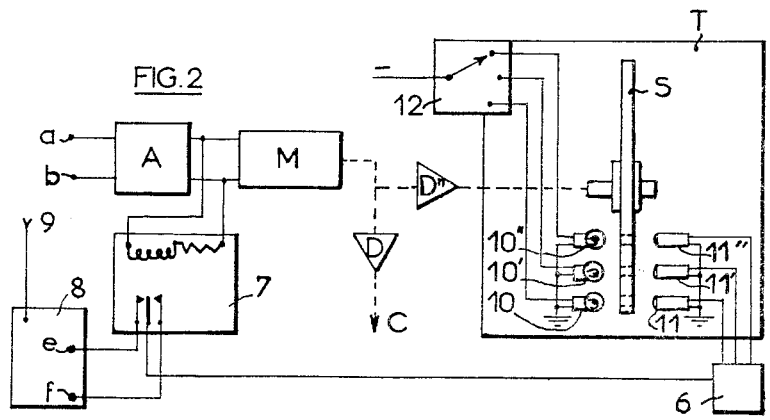

For a better understanding of the invention, and to show how the same may be carried into effect, reference will now be made to the accompanying diagrammatic drawings, in which:

FIGURE 1 is a schematic circuit diagram of an analogue computer constructed in accordance with the present invention, FIGURE 2 is a schematic diagram of an arrangement for translating into digital form values conforming to the function measured by the computer shown in FIGURE 1, FIGURE 3 is a front view of a perforated disc provided in the arrangement shown in FIGURE 2, and FIGURE 4 is a graph showing a possible curve of response of the computer shown in FIGURE 1.

The analogue computer the circuit of which is schematically shown in FIGURE 1 includes a graduated potentiometer 1 having a plurality of contacts. Assuming that the function which may be computed by this arrangement is represented by the equation $y=f(x)$, then a value conforming to the function $y$ is obtained in analogue form which depends upon the position of a cursor $C$ of the potentiometer 1 with respect to a fixed base or reference point of the potentiometer. The fixed base or reference may be for instance one of the potentiometer terminals, usually the terminal which coincides with one of its ends, that is the contact $p_0$. Parallel adjustable resistances $R_1$, $R_2$ and $R_3$ are used to connect contacts of the potentiometer 1 in a manner described below. The resistance $R_1$ extends between the contacts $p_0$ and $p'_1$. The resistance $R_2$ extends between contacts $p'_1$ and $p'_2$. The resistance $R_3$ extends between $p'_2$ and $p'_3$. The contacts $p_0$, $p'_1$, $p'_2$ and $p'_3$ are hereinafter referred to as principal contacts. Between every pair of principal contacts, the potentiometer 1 is provided with three intermediate contacts, for instance see intermediate contacts $p_1$, $p_2$, $p_3$ between $p_0$ and $p'_1$. The intermediate contacts are used to adjust the graphical curve of response of the computer as hereinafter explained. Each of the intermediate contacts is positioned in order to correspond to a determined value of the function $y$ in dependence upon the position of the cursor $C$ of the potentiometer 1. In the example herein given, the origin of $y$ is selected at $p_0$ and its maximum value is reached when the cursor $C$ is in contact with the principal contact $p'_3$ at an end terminal of the potentiometer 1. The value $y$ is divided in a thousand equal parts and the intermediate contacts $p_1$, $p_2$ and $p_3$ correpond respectively to values 50, 100 and 200 of the variable $y$; the intermediate contacts $p_4$, $p_5$, $p_6$ correspond to the values 300, 400 and 500 of the variable $y$ and the contacts $p_7$, $p_8$, $p_9$ to the values 600, 700 and 800 of the variable $y$. The potentiometer 1 is connected at its two principal contacts $p_0$ and $p'_3$ respectively in series with two adjustable resistances 2 and 3, a fixed resistance 4 is also connected in series with adjustable resistance 2. The value of resistance 4 is preferably very small with respect to the value of the resistance of the potentiometer 1. The arrangement of potentiometer 1, and resistances 2, 3, 4 is such that they are connected in series between the terminals of a constant voltage source $U_0$.

The variable $X$ of which the function $f(X)$ must be computed, must necessarily be obtained in the computer in a physical form consisting of an electrical voltage $x$. The variable $X$ may have any physical form. It is sufficient in order to be able to use the variable $X$ in the computer herein described to translate the variable into an electrical voltage $x$ of which the amplitude is proportional to the variable $X$. If the variable $X$ has a digital form, it must first be translated into an analogue form by means consisting of several known arrangements.

During gauging hereinafter described of the graphical curve of response of the computer, the electrical voltage $x$ is applied successively on the amplifiers $A_0$, $A_1$, $A_2$, $A_3$. The second input terminal $b_0$ of amplifier $A_0$ is connected to the principal contact $p_0$ of potentiometer 1. Push buttons $P_1$ to $P_9$ selectively connect any one of the intermediate contacts $p_1$, $p_2$, $p_3$ to the second input terminal $b_1$ of amplifier $A_1$, any one of the intermediate contacts $p_4$, $p_5$, $p_6$ to the second input terminal $b_2$ of amplifier $A_2$ and any one of the intermediate contacts $p_7$, $p_8$, $p_9$ to the second input terminal one of the intermediate contacts $p_7$, $p_8$, $p_9$ to input terminal $b_3$ of amplifier $A_3$. When the differential amplifiers $A_0$, $A_1$, $A_2$ and $A_3$ are operative, that is to say when they receive at their supply ends $c_0$, $c_1$, $c_2$, $c_3$ respectively, an input voltage there results at their output ends $d_0$, $d_1$, $d_2$ or $d_3$ an electrical voltage of which the amplitude is proportional to the difference between the voltages applied at the pairs of input terminals $a_0$ and $b_0$, or $a_1$ and $b_1$, or $a_2$ and $b_2$, or $a_3$ and $b_3$. This differential output voltage of which the polarity depends upon the algebraic sign of the difference between the input voltages at the two corresponding input terminals $a$ and $b$ and which is zeroized at the same time as this difference, is transmitted to the windings of the motors $M_0$, $M_1$, $M_2$, or $M_3$. The motors $M_0$, $M_1$, $M_2$ or $M_3$ each have an output shaft which is coupled by means of a gear down arrangement $D_0$, $D_1$, $D_2$ or $D_3$ respectively to movable contactor members for adjusting the values of the resistances 2, $R_1$, $R_2$ or $R_3$. The motors $M_0$, $M_1$, $M_2$ and $M_3$ arranged so that their direction of rotation depends upon the polarity of the differential voltage applied to their armature windings and their rotation is interrupted when the differential voltage is zero. The contactor member for adjusting the value of the resistance 3 is coupled by means of a gear down arrangement $D'$ to the shaft of a motor $M'$ of which the armature windings are connected to the voltage at the outlet $d'$ of a differential amplifier $A'$. The first input terminal $a'$ of differential amplifier $A'$ is connected to a standard or reference voltage source $+U_1$, while a second input terminal $b'$ is connected at its common point between the adjustable resistance 2 and the fixed resistance 4. Each set of differential amplifier A motor M and gear down arrangement constitutes a servo mechanism for moving a contactor member of a resistance.

In order to use the computer once it has been gauged or calibrated, the electrical voltage $x$ is applied to the input terminal $5'$ of an inverter 5 whose input terminal $5''$ is connected to the negative pole of the voltage source which supplies current to the resistances 1, 2, 3 and 4. The output of the inverter 5 is connected to a first input terminal of a differential amplifier A which has a second input terminal $b$ which is connected electrically to the cursor C of the potentiometer 1. The voltage which appears at the output end $d$ of the differential amplifier A, and, which is proportional to the difference between the voltages at input terminals $a$ and $b$ and of the same algebraic sign as this difference, is applied to the armature windings of the motor M which has an output shaft coupled by means of a gear down arrangement D to the cursor C of the potentiometer 1 and to a cursor $C'$ of a second potentiometer $1'$ which is connected to a constant voltage source of voltage $+U_2$, whereby the cursors C and $C'$ are moved along their respective potentiometers to vary the value of the resistance thereof.

The operation of the analogue computer will hereinafter be described, particularly when it is used for automatically gauging or calibrating a measuring device. The variable quantity X coincides, in this example, with data obtained from the measuring device, for instance during rotation of a part thereof. This variable quantity X must be translated into an electrical voltage $x$ of amplitude proportional, for instance, to the said rotation. The graphical curve of response $y=f(x)$ of the computer must be adjusted so as to present several points coinciding with the graphical curve of the measuring device which is represented by the equation $Y=F(X)$.

In order to gauge the computer, the quantity to be measured Y is first given a zero value. The corresponding value $X_0$ provided by the measuring device is then translated into an electrical voltage of value $x_0$, which is not usually zero. This electrical voltage is applied at the first input terminal of $a_0$ of the differential amplifier $A_0$ which has a terminal of $c_0$ which receives a supply voltage necessary for the operation of the differential amplifier. The motor $M_0$ is energized and displaces through its connection with the gear down arrangement $D_0$ the contactor member of the adjustable resistance 2. As a result of this variation in the value of the resistance 2, the intensity of the current $i$ flowing through the potentiometer 1 and the resistances 2, 3 and 4 and originating from the voltage source $U_0$ also is varied. The same result occurs at the terminals of the fixed resistance 4 and as a result of the difference between the voltages applied between two input terminals $a'$, $b'$ of the differential amplifier $A'$, the latter drives the motor $M'$ which has its output shaft connected through the gear down arrangement $D'$ with the contactor member of the variable resistance 3. The electrical connections are effected so that the variations of the value of the resistance 3 exactly compensate or balance the variations of the value of the resistance 2 in order to maintain constant the value of the current $i$ traversing the potentiometer 1 and the resistances 2, 3 and 4. Since the motor $M'$ only stops when the voltages applied at the input terminals $a'$ and $b'$ of differential amplifier $A'$ are equal, the drop in the voltage between the terminals of the resistance 4 is maintained constant and equal to the voltage $+U_1$ applied at the input terminal $a'$. Hence, the assembly including the resistance 4, the differential amplifier $A'$, the motor $M'$, the gear down arrangement $D'$, and the adjustable resistance 3 constitutes a regulator which controls the value $i$ of the current which flows through potentiometer 1 and through the adjustable resistance 2 in series with the potentiometer. The value of the current flowing through the adjustable resistance 2 is thus maintained constant, the variations of the value of the resistance 2 cause proportional variations of the potential at the principal terminal $p_0$ of the potentiometer 1 with respect to the negative pole of the voltage source $U_0$, and hence there are produced proportional variations in the difference between the voltages applied at the input terminals $a_0$, $b_0$ of the differential amplifier $A_0$. The electrical connections are such that the motor $M_0$ drives the contactor member of the resistance 2 in a direction such that the voltage $V_{p_0}$ of the principal contact $p_0$ varies and approaches in magnitude the voltage $x_0$ applied to the input terminal $a_0$ of the differential amplifier $A_0$; the motor $M_0$ stops when $V_{p_0}=x_0$.

The next step when gauging the computer consists in giving to the quantity to be measured Y, one of the gauging or calibrating values corresponding to one of the intermediate contacts $p_1$, $p_2$, $p_3$ of the potentiometer 1 which is associated with the resistance $R_1$ between the principal contacts $p_0$ and $p'_1$. Assuming for instance that this quantity Y is given a value 100 corresponding to intermediate contact $p_2$, the electrical voltage $x_{100}$ which is proportional to the information $X_{100}$ then obtained from the measuring device is applied to the first input terminal $a_1$ of the differential amplifier $A_1$ of which the second input terminal $b_1$ is connected to the intermediate contact $p_2$ of the potentiometer 1 when push-button $P_2$ is pressed down. The required voltage is applied to the supply $c_1$ of differential amplifier $A_1$ to operate the same. The intermediate contact $p_2$ being normally, in view of the current which flows through the potentiometer 1 and resistances 2, 3, 4, $R_1$, $R_2$, $R_3$, at a voltage which is different from $x_{100}$, there is produced an output voltage at the output end $d_1$ of the differential amplifier $A_1$ which drives the motor $M_1$, and this motor acts through the gear down arrangement $D_1$ upon the contactor member of the adjustable resistance $R_1$ so that the value of the resistance $R_1$ is varied to change the value of the total resistance which is connected between the terminals of the voltage source $U_0$. In spite of this variation the magnitude of the current $i$ that this source of voltage transmits through the potentiometer 1 and the resistances 2, 3, 4, $R_1$, $R_2$, $R_3$, is maintained constant by the action of the current regulator comprising the resistances 3, 4, the differential amplifier $A'$, the motor $M'$, and the gear down arrangement of this servo mechanism $D'$, in the manner previously described. As a result the principal contact $p_0$ of the potentiometer 1 remains at a constant potential. However, since the value of the resistance $R_1$ with respect to the value of the resistance of the potentiometer 1 between the principal contacts $p_0$ and $p'_1$ has been changed, there is a change in the value of the current $i'$ which flows through the section $p_0$, $p'_1$ of the potentiometer. As a result of the constant potential at terminal contact $p_0$ and in view of the variation of the value of the current $i'$ there is a variation in the voltage of the intermediate contact $p_2$ which is applied to the second input terminal $b_1$ of the differential amplifier $A_1$, and hence as a consequence the difference between this last mentioned voltage and the voltage $x_{100}$ applied at the first input terminal $a_1$ of differential amplifier $A_1$. The electrical connections are such that the motor $M_1$ changes the value of the resistance $R_1$ in a direction such that the voltage $V_{p_2}$ existing at the intermediate contact $p_2$ tends to become equal to the value $x_{100}$, motor $M_1$ then stopping when $V_{p_2}=x_{100}$.

The subsequent phases in the gauging of the computer are similar to those which have already been described. For instance, the gauging value 300 is given to the quantity to be measured $Y$, the electrical voltage $x_{300}$ proportional to the information $X_{300}$ then obtained from the measuring device is applied to the first input terminal $a_2$ of the differential amplifier $A_2$ and the push-button $P_4$ is then pushed down until the motor $M_2$ has adjusted the value of the resistance $R_2$ so that the voltage $V_{p_4}$ on the intermediate contact $p_4$ of the potentiometer 1 is equal to the voltage applied at the input terminal $a_2$ of differential amplifier $A_2$, that is to say $V_{p_4}=x_{300}$. The value 600 being then given to the quantity $y$ to be measured, the voltage $x_{600}$ is applied at the first input terminal $a_3$ of the differential amplifier $A_3$ and the push-button $P_7$ is pushed down, when the motor $M_3$ stops, the resistance $R_3$ has become adjusted to a value such that the voltage $V_{p_7}$ of the intermediate contact $p_7$ is equal to $x_{600}$. All the adjustable resistances of the computer being thus adjusted to predetermined values, the gauging of its graphical curve of response is completed.

It is possible to check that this gauging is correct by successively applying voltages $x_{100}$, $x_{300}$ and $x_{600}$ at the input terminal $a$ of the differential amplifier A. Then, the device indicating the value of $y$ must indicate, in the particular example considered, respectively 100, 300 and 600. For instance, when the voltage $x_{100}$ is applied on the input terminal $a_1$ it is also simultaneously applied to the terminal $5'$ of the inverter 5 which transmits the same to the input terminal $a$ of the amplifier A. As a result the cursor C is displaced until a voltage of value $x_{100}$ is picked up on the potentiometer 1, the cursor then being stopped facing the intermediate contact $p_2$ so that its position then corresponds to a value $y=100$, since, by definition, in the particular example selected, the voltage $x_{100}$ corresponds to a value 100 of the quantity to be measured $Y$. Also, the simultaneous application of the voltage $x_{300}$ on the input terminals $a_2$ and $a$ results in a movement of the cursor C until it stops at a position corresponding to $y=300$ and the simultaneous application of the voltage $x_{600}$ on the input terminals $a_3$ and $a$ moves the cursor C until it stops at a position corresponding to $y=600$.

The graphical curve of response of the analogue computer is shown in FIGURE 4 for equation $y=f(x)$ plotted on cartesian coordinates, when the potentiometer 1 is linear, that is to say when the value $r$ of the resistance between cursor C and its principal contact $p_0$ varies as a direct function of the position $y$ of the said cursor C in accordance with a linear law, the resistance $R_1$, $R_2$ and $R_3$ being assumed to be disconnected. This curve traverses through the four gauging points corresponding respectively to terminal contact $p_0$, and to intermediate contacts $p_2$, $p_4$ and $p_7$ of the potentiometer. On either side of each of these successive gauging points corresponding to intermediate contacts $p_2$, $p_4$, $p_7$, the curve is rectilinear and has a slope which depends from the value at which any one of the resistances $R_1$, $R_2$ or $R_3$ associated with the corresponding intermediate contact $p_2$, $p_4$ or $p_7$ has been adjusted. Thus, assuming that the cursor C is situated initially opposite one of the principal contacts of the potentiometer 1, for instance $p'_1$, when the cursor is displaced $\Delta y$ in the direction of the next principal contact $p'_2$, corresponding to a fraction of resistance $\Delta r$ of the section of the potentiometer between $p'_1$ and $p'_2$, the voltage transmitted through the cursor C of the potentiometer follows the variation $\Delta x=\Delta r.i''$, $i''$ corresponding to the current which flows through the section between contacts $p'_1$-$p'_2$ of the potentiometer 1. When the resistance of the last mentioned section is identified by $r_{1.2}$ it is possible to demonstrate that $$i''=\frac{R_2}{R_2+r_{1.2}}i$$

Hence, when the potentiometer is linear the slope $$\frac{\Delta y}{\Delta x}$$

of the segment $p'_1$-$p'_2$ of the graphical curve of response of the computer has a value which is proportional to $$\frac{1}{i}\left(1+\frac{r_{1.2}}{R_2}\right)$$

i.e. a constant value ($i$ being regulated to have a constant value), which depends in a simple manner upon the value to which the resistance $R_2$ has been adjusted.

In fact the regulation of $i$ by elements 3, 4, $a'$, $b'$, A', M' and D' maintains constant said current $i$ which flows through the resistances 3, 1, 2 and 4.

The sums of the currents respectively flowing through $R_1$ and $p_0$-$p'_1$, through $R_2$ and $p'_1$-$p'_2$ and through $R_3$ and $p'_2$-$p'_3$ is equal to $i$ since whatever may be the values of $R_1$, $R_2$ and $R_3$, said current $i$ is maintained constant during the successive adjustment of $R_1$, then of $R_2$ and finally of $R_3$.

For example, the voltage $V''$ between $p'_1$ and $p'_2$ in relation to the current flowing through $R_2$ and $p'_1$-$p'_2$ is given by the formula:

$$V''=i''r_{1.2}=i\frac{R_2 \cdot r_{1.2}}{R_2+r_{1.2}}$$

whence:

$$i''=\frac{R_2}{R_2+r_{1.2}}i$$

Similarly:

$$\Delta x=\Delta r i''=\Delta r\frac{R_2}{R_2+r_{1.2}}i$$

whence:

$$\frac{\Delta r}{\Delta x}=\frac{1}{i}\left(1+\frac{r_{1.2}}{R_2}\right)$$

The analogue thus gauged computer is then used to gauge or calibrate unknown measurements from a measuring device in the following manner: The contactor member of inverter 5 is first moved to engage the terminal $5''$ connected to the negative pole of the voltage source $U_0$. As a result there is produced at the output terminal $d$ of the differential amplifier A an output voltage which is proportional to the amplitude of the voltage transmitted through the cursor C of the potentiometer 1 depending upon the position occupied by the cursor. The electrical connections are such that the application of this output voltage from the differential amplifier A to the windings of the motor M rotates the motor and the output shaft thereof and through the gear down arrangement D the cursor C which is coupled thereto is moved in such a direction that it is displaced towards the principal contact $p_0$ of the potentiometer 1. The motor M stops when the cursor C has reached a position opposite terminal $p_0$ and this position thereof corresponds to that point of potentiometer 1 where the voltage picked up thereon is the weakest. The contactor member of inverter 5 is then engaged with its terminal 5' to which there is applied an unknown voltage $x$ of which the amplitude is proportional to an input data X obtained from the measuring device. As a result there is produced at the output end $d$ of the differential amplifier A a voltage proportional to $x$ which moves the cursor C by means of the motor M and the gear down arrangment D in such a direction that the cursor C moves away from the principal terminal $p_0$ of the potentiometer 1 and moves to such a position with respect to the principal contact $p_0$ that when the motor M stops, the voltage picked up on the potentiometer 1 through the cursor is exactly equal to $x$. The position of the cursor C with respect to $p_0$ by definition is an approximate value of the function $y$. The value of $y$ is basically geometrical (linear displacement or angle of rotation depending upon the type of the potentiometer 1), but it may have conformance with an electrical value by using potentiometer 1' of which the cursor C' is also coupled with the cursor C of potentiometer 1 and to the gear down arrangment D. In the given example, wherein a constant voltage $U_2$ is applied to the terminals of potentiometer 1', an electrical voltage proportional to the function $y$ is given by the difference of potential between the cursor C' and one of the ends of the potentiometer 1'.

The ordinate of the point C of abscissa $x$ of the graphical curve of response of the computer, which is shown in FIGURE 4, is only an approximate value of the function $F(X)$ to be computed and hence of the value Y to be determined. The approximation obtained will be the better as the number of gauging points on the curve of response is increased, that is as the number of principal contacts of the potentiometer connected with adjustable resistances is increased. In the given example wherein three gauging points are utilized there is obtained an approximation which is generally sufficient. Further, an improved approximation may be obtained by substituting for each of the rectilinear portions of the curve of response of the computer such as between points $p'_1$, $p'_2$ of the curve, a curved segment of required order, which is more approximate to the corresponding segment of the curve $Y=F(X)$ then said rectilinear portion of the curve. In order to obtain this result it is sufficient that the law of variation of the resistances along the corresponding section of the potentiometer 1 be of any desired curve instead of being linear so that the resistance between the cursor C of the potentiometer and its principal contact $p_0$ varies in accordance with an appropriate function of the position $y$ of the said cursor, for instance as a quadratic function, an exponential function, a sinusoidal function, and the like. In addition, such a function may not be the same for the different sections of the potentiometer which are respectively limited by two of its successive principal contacts, for instance for the section between $p'_1$, $p'_2$.

When the function Y becomes null at the same time as the variable quantity X and the proportional voltage $x$, then $x_0=0$. The adjustable resistance 2 must then be adjusted to the value 0 which is possible without the use of the servo-mechanism $A_0M_0D_0$; the servo-mechanisms $A_0M_0D_0$, $A_1M_1D_1$, $A_2M_2D_2$, $A_3M_3D_3$, and eventually AMD may be identical and since they are not simultaneously used it is possible to provide only a single servo-mechanism and to provide the same with means permitting the operation of the shaft successively connected to its gear down arrangement on the contactor member for adjusting each of the adjustable resistances 2, $R_1R_2R_3$ and then to the cursor C of the potentiometer 1.

There is hereinafter described an arrangement used to obtain an approximate value of the function $y$ in a digital form by translating its analogue value obtained from the position of the cursor C of the potentiometer 1. This arrangement includes a means T for translating analogue values into digital form which delivers a plurality of electrical pulses proportional to the value of the analogue quantity. In the embodiment shown in FIGURES 2 and 3, this means for translating the analogue quantity into a digital form includes a perforated disc S which is rotated by the shaft of the motor M through a gear down arrangement D" in order to interrupt periodically a beam of light which falls upon a photocell 11, 11' or 11". The electrical pulses produced by the photo-cell are shaped by means of a shaping circuit 6, such as a Schmitt trigger which emits regular trains of pulses. These trains of pulses are transmitted either to an adding up circuit $e$ or to a subtracting circuit $f$ of an electrical pulse counter 8, such as a chain of binary counters. The number of electrical pulses emitted by the photo-cell 11, 11' or 11" of the translating means T is proportional to the algebraic sum of the angles through which the perforated disc S has been rotated and which are themselves proportional to the displacements of the cursor C driven by the motor M. The number of pulses thus emitted is added to or subtracted from the algebraic sum of the pulses previously received by the counter 8 depending upon the polarity of the output voltage from differential amplifier A. The pulse counter 8 is automatically reset to zero each time that the cursor C of the potentiometer 1 returns to its principal contact $p_0$. This resetting to zero is provided by the closing of contact 9, 9' which is operated mechanically by the cursor C at the end of its travel. In this described embodiment, the means for translating analogue quantities into digital form enables to obtain three different values for the translation, that is of the number of pulses which is emitted for a determined digital form of the analogue quantity to be translated. These three values which are translated are preferably multiples each of the others. This translation into multiple values is obtained by placing on the disc S three circular rows of perforations of different radii and comprising respectively ten, five or two perforations. A lamp 10, 10', 10" and a photo-cell 11, 11', 11" are associated with each of the rows of perforations by means of a commutator 12 and only the lamp corresponding to the selected analogue quantity to be translated receives a voltage input.

Due to the range of the digital values which are practically utilized for gauging the device it is advantageous in order to reduce the relative errors to utilize the whole of potentiometer 1 rather than a part thereof.

The three circular rows of perforations allow to transpose the analogue values of the measuring system into three ranges of digital forms according to the lamp 10, 10' or 10" selected by commutator 12 and its corresponding photo-cell 11, 11' or 11" in order to obtain, for example, a first range extending from 0 to 200 pulses, a second range extending from 0 to 500 pulses and a third range extending from 0 to 1000 pulses.

As previously indicated the analogue computer described herein enables after adjusting of its characteristic curve of response to render information obtained from any measuring device immediately and automatically usable in any automatic installation, particularly in apparatus to automatically perform chemical operations and similar or related operations for instance as described in my United States patent application Serial No. 35,654 filed on June 13, 1960. When using the computer with fully automatic installations, the adjustment of the graphical curve of response may also be effected automatically. It is sufficient for this purpose that the different controlling contacts of the system more particularly those corresponding to the push-buttons $P_1$ to $P_9$ may be automatically closed for a short interval. More particularly, these contacts may be controlled by means of relays to which the automatic installation transmits the required commands. The end of each phase of operation may be signalled to the installation for instance by providing a special circuit controlled by a time-delayed relay which becomes operative upon stopping of one of the motors for each phase of operation.

I claim:

1. An analogue computer for determining the approximate analogue values of a function which is related to an independent variable quantity, comprising, in combination, a source of constant voltage including two poles, a potentiometer connected to said source and through which current produced by said source flows, said potentiometer including a movable cursor and contacts which divide said potentiometer into sections and which, for gauging the computer, are respectively affected to determinate successive analogue values of said quantity from one end of said potentiometer, means for maintaining constant current through said potentiometer; means for gauging the computer including adjustable resistances respectively connected in parallel across said sections, means for supplying adjusting voltages which respectively represent the determinate analogue values of said quantity to which said contacts are affected, means controlled by said adjusting voltages for successively adjusting said adjustable resistances in their succession order from said potentiometer end for obtaining at the contact of each section which is the more remote from said end a voltage equal to that of the adjusting voltage representing the determinate analogue value of said quantity to which said contact is affected; and means for utilizing said computer including electromechanical means independently controllable by said constant voltage and said adjusting voltages and mechanically and electrically connected with said cursor in order to displace the latter in contacting engagement with said end, under the action of said constant voltage, and under the action of each adjusting voltage, to a point of said potentiometer having a voltage equal to that of said adjusting voltage while the distance of said point from said end represents the approximate analogue value of said function for the value of said quantity represented by said adjusting voltage, and means for independently connecting said electromechanical means with said source of constant voltage and said means for supplying adjusting voltages.

2. An analogue computer for determining the approximate analogue values of a function which is related to an independent variable quantity, comprising, in combination, a source of constant voltage, a potentiometer connected to said source through which current produced by said source flows, said potentiometer including a movable cursor and contacts which divide said potentiometer into sections, intermediate contacts in each section which divide said section into sub-sections and which, for gauging the computer, are respectively affected to determinate successive analogue values of said quantity from one end of said potentiometer, means for maintaining constant the current through said potentiometer; means for gauging the computer including adjustable resistances respectively connected in parallel across said sections, a means for supplying adjusting voltages which respectively represent the determinate analogue values of said quantity to which said intermediate contacts are affected, means respectively connectable to each one of the intermediate contacts of said sections and controlled by said adjusting voltages for successively adjusting said adjustable resistances in their succession order from said potentiometer end for obtaining at one intermediate contact of each section, when connected to said last means, a voltage equal to that of the adjusting voltage representing the determinate analogue value of said quantity to which said intermediate contact is affected; and means for utilizing said computer including electromechanical means independently controllable by said constant voltage and said adjusting voltages and mechanically and electrically connected with said cursor in order to displace the latter in contacting engagement with said end, under the action of said constant voltage, and under the action of each adjusting voltage to a point of said potentiometer having a voltage equal to said adjusting voltage while the distance of said point from said end represents the approximate analogue value of said function for the value of said quantity represented by said adjusting voltage, and means for independently connecting said electromechanical means with said source of constant voltage and said means for supplying adjusting voltages.

3. An analogue computer according to claim 2 wherein the means for maintaining constant the current flowing through the potentiometer comprises, a first variable resistance connected by one of its ends with said end of the potentiometer and having a movable contactor member connected with said end, a second variable resistance interconnecting the other end of said potentiometer and one pole of said source of constant voltage and having a movable contactor member connected with said pole, a fixed resistance interconnecting the other end of said first variable resistance and the other pole of said source of constant voltage, a source of standard current, a first servo-mechanism mechanically connected with the contactor member of said first variable resistance and sensitive to the difference between the voltage at said potentiometer end and the adjusting voltage which represents the analogue value of said quantity for which said function becomes null, and a second servo-mechanism mechanically connected with the contactor member of said second variable resistance and sensitive to the difference between the voltage of said standard source and the voltage at the other end of said first variable resistance, whereby the variation of each variable resistance resulting from a displacement of its contactor member is compensated by a variation of the other variable resistance due to the displacement of its contactor member.

4. An analogue computer according to claim 2 wherein the adjustable resistances respectively include movable contactor members, and wherein the means for adjusting an adjustable resistance comprises a gearing down arrangement mechanically connected to the contactor member thereof, a motor driving said arrangement and a differential amplifier including an output terminal connected with said motor and two input terminals respectively connected with said means for supplying adjusting voltages and with the contact of the corresponding section which is the nearest to the potentiometer end.

5. An analogue computer according to claim 2 wherein the electromechanical means and the means connecting it with said source of constant voltage and said means for supplying adjusting voltages comprise an inverter including an output terminal and two input terminals respectively connected with said means for supplying adjusting voltages and said source of constant voltage, a differential amplifier including an output terminal and two input terminals respectively connected with said inverter output terminal and said cursor, and a motor means mechanically connected with said cursor and electrically connected with said differential amplifier output terminal.

6. A computer for determining the approximate analogue and digital values of a function which is related to an independent variable quantity, comprising, in combination, a source of constant voltage, a potentiometer connected to said source and through which the current produced by said source flows and having a movable cursor and contacts which divide said potentiometer into sections, intermediate contacts in each section which divide said section into sub-sections and which, for gauging the computer, are respectively affected to determinate successive analogue value of said quantity from one end of said potentiometer, means for maintaining constant said current through said potentiometer; means for gauging the computer including adjustable resistances respectively connected in parallel across said sections, a device supplying adjusting voltages which respectively represent the determinate analogue values of said quantity to which said intermediate contacts are affected, means respectively connectable to each one of the intermediate contacts of said sections and controlled by said adjusting voltages for successively adjusting said adjustable resistances in their succession order from said potentiometer end for obtaining at one intermediate contact of each section, when connected to said last means, a voltage equal to the adjusting voltage representing the determinate analogue value of said quantity to which said intermediate contact is affected; and means for utilizing said computer including electromechanical means independently controllable by said constant voltage and said adjusting voltages and mechanically and electrically connected with said cursor in order to displace the latter in contacting engagement with said end, under the action of said constant voltage, and, under the action of each adjusting voltage, to a point of said potentiometer having a voltage equal to that of said adjusting voltage while the distance of said point from said end represents the approximate analogue value of said function for the value of said quantity represented by the voltage of said adjusting voltage, means for independently connecting said electromechanical means with said source of constant voltage and said device, means controlled by said electromechanical means for transforming the analogue form of the approximate values of said function given by the displacements of said cursor from said potentiometer end into a digital form, and means controlled by said electromechanical means for representing the approximate analogue values of said function by voltages.

7. A computer according to claim 6 wherein the means for representing the approximate analogue values of said function by voltages comprises an auxiliary potentiometer, a second source of constant voltage supplying said auxiliary potentiometer, a cursor for said auxiliary potentiometer, and a kinematic chain interconnecting the cursors of said potentiometer and auxiliary potentiometer.

8. A computer according to claim 6 wherein the means for transforming an analogue form of the function into a digital form comprises a disc mounted to rotate about an axis and provided with apertures distributed about a circular row concentric with said axis, a kinematic chain connecting said disc and said cursor whereby displacement of the cursor corresponds to a proportional rotation of said disc, a source of light and a photo-cell which are operatively connected and facing said apertures to cause the formation of a succession of pulses in an electrical circuit during rotation of said disc, and a counting device provided to respectively add and subtract said pulses during rotation of said disc.

9. A computer according to claim 8 wherein said apertures are distributed in circular rows, there being a different number of apertures for each circular row and wherein there are provided a number of sources of light and photo-cells equal to the number of circular rows of apertures in said disc, and including a commutator for selectively placing into operation only one of said sources of light.

10. In a computer for determining the approximate analogue and digital values of a function which is related to an independent variable quantity, of the type including a potentiometer through which flows the current of a source of constant voltage and including a movable cursor and successive contacts, the voltages at said contacts being adjusted so that, on the one hand, the voltage at one end of said potentiometer represents the analogue value of said quantity for which said function becomes null, and, on the other hand, the voltages at certain of the other contacts in their successive order from said end respectively represent determinate successive analogue values of said quantity; the improvement which comprises means for displacing said cursor along the potentiometer from said one end in relation to each adjusted voltage, and means for transforming the analogue form of the approximate values of said function given by the displacements of said cursor from said potentiometer end into a digital form.

11. Analogue computer as claimed in claim 10 wherein the means for transforming an analogue form of the function into a digital form comprises: a disc mounted to rotate about an axis and provided with apertures distributed about circular row concentric with said axis, a kinematic chain connecting the disc and said cursor whereby displacement of the cursor corresponds to a proportional rotation of the disc, a source of light and a photocell which are connected and facing said apertures to cause the formation of a succession of pulses in an electrical circuit during rotation of said disc, and a counting device provided to respectively add and subtract these pulses during rotation of said disc.

12. Analogue computer as claimed in claim 11, wherein said apertures are distributed in circular rows, there being a different number of apertures for each circular row and wherein there are provided a number of sources of light and photo-cells equal to the number of circular rows of apertures in said disc, and including a commutator provided in order to place selectively into operation only one of said sources of light.

13. A current regulating device comprising, in combination, a source of constant voltage, said source including two poles, a potentiometer connected to said source and through which current produced by said source flows, a first source of standard voltage, a second source of standard voltage, a first variable resistance connected by one of its ends with one end of the potentiometer and having a movable contactor member connected with said end, a second variable resistance interconnecting the other end of said potentiometer and one pole of said source of constant voltage and having a movable contactor member connected with said pole, a fixed resistance interconnecting the other end of said first variable resistance and the other pole of said source of constant voltage, a first servo-mechanism mechanically connected with the contactor member of said first variable resistance and sensitive to the difference between the voltage at said potentiometer end and the voltage of said first standard source, and a second servo-mechanism mechanically connected with the contactor member of said second variable resistance and sensitive to the difference between the voltage of said second standard source and the voltage at the other end of said first variable resistance, whereby the variation of each variable resistance resulting from a displacement of its contactor member is compensated by a variation of the other variable resistance due to the displacement of its contactor member, so that the current flowing through said potentiometer and series connected fixed and variable resistances remains constant.

14. Analogue computer for determining the approximate values of a function which is related to a variable quantity, comprising, in combination; a source of constant voltage, a potentiometer connected to said source and through which current produced by said source flows and having a movable cursor and provided with a plurality of principal contacts which divide the resistance of the potentiometer into a plurality of sections through which the current flows, a plurality of adjustable resistances connected in parallel across the sections of the potentiometer, a source of unknown voltage which is a translation of the variable quantity, means respectively connectable to each one of said principal contacts and controlled by said unknown voltage for successively adjusting said adjustable resistances in their successive order from one of said principal contacts selected as a reference and for which the voltages existing between itself and the other principal contacts in said successive order are respectively proportional to successive magnitudes of the variable quantity, means for moving said cursor along said potentiometer so that the position of said cursor, with respect to said principal contact selected as a reference provides a value proportional to the corresponding value of the function, a disc mounted to rotate about an axis and provided with apertures distributed about circular row concentric with said axis, a kinematic chain connecting the disc and said cursor whereby displacement of the cursor corresponds to a proportional rotation of the disc, a source of light and a photo-cell which are connected and facing said apertures to cause the formation of a succession of pulses in an electrical circuit during rotation of said disc, and a counting device provided to respectively add and subtract these pulses during rotation of said disc.

15. Analogue computer as claimed in claim 14 wherein said apertures are distributed in circular rows, there being a different number of apertures for each circular row and wherein there are provided a number of sources of light and photo-cells equal to the number of circular rows of apertures in said disc, and including a commutator provided in order to place selectively into operation only one of said sources of light.

References Cited in the file of this patent

UNITED STATES PATENTS

| 364,305 | Hook | June 15, 1943 |
| 2,925,956 | Giao et al. | Feb. 23, 1960 |
| 3,058,005 | Hurvitz | Oct. 9, 1962 |

OTHER REFERENCES

Korn and Korn: "Electronic Analog Computers," published by McGraw-Hill Company, 1956, pp. 321–9, particularly FIG. 6.48.

Ser. No. 364,305, Hook (A.P.C.), published June 15, 1943.